(12) United States Patent
Purohit

(10) Patent No.: US 9,436,842 B2
(45) Date of Patent: Sep. 6, 2016

(54) DISTRIBUTED FRAGMENTS FILE SYSTEM

(71) Applicant: Vinay Purohit, Branchburg, NJ (US)

(72) Inventor: Vinay Purohit, Branchburg, NJ (US)

(*) Notice: Subject to any disclaimer, the term of this patent is extended or adjusted under 35 U.S.C. 154(b) by 0 days.

(21) Appl. No.: 14/461,931

(22) Filed: Aug. 18, 2014

(65) Prior Publication Data

US 2015/0052354 A1 Feb. 19, 2015

Related U.S. Application Data

(60) Provisional application No. 61/866,746, filed on Aug. 16, 2013.

(51) Int. Cl.
| | |
|---|---|
| *G06F 21/60* | (2013.01) |
| *G06F 21/62* | (2013.01) |
| *G06F 17/30* | (2006.01) |
| *H04L 29/08* | (2006.01) |
| *G06F 11/00* | (2006.01) |

(52) U.S. Cl.
CPC ............ *G06F 21/6218* (2013.01); *G06F 11/00* (2013.01); *G06F 17/30194* (2013.01); *G06F 21/6272* (2013.01); *H04L 67/1097* (2013.01)

(58) Field of Classification Search
CPC ..................... G06F 17/30194; G06F 21/6218; G06F 21/6272; G06F 11/00; H04L 67/1097
See application file for complete search history.

(56) References Cited

U.S. PATENT DOCUMENTS

| | | | |
|---|---|---|---|
| 6,571,261 B1* | 5/2003 | Wang-Knop et al. | |
| 8,788,910 B1* | 7/2014 | Northcott | 714/773 |
| 2007/0244992 A9* | 10/2007 | Gailer et al. | 709/219 |
| 2007/0260609 A1* | 11/2007 | Tulyani | H04L 67/1097 |
| 2008/0263113 A1* | 10/2008 | Krishnaiyer et al. | 707/205 |
| 2009/0150736 A1* | 6/2009 | Nebat et al. | 714/748 |
| 2009/0271412 A1* | 10/2009 | Lacapra | G06F 17/30206 |
| 2010/0217887 A1* | 8/2010 | Bouazizi et al. | 709/231 |

* cited by examiner

*Primary Examiner* — Tri Tran

(57) ABSTRACT

The present invention relates to a distributed storage scheme, wherein every file is optionally encrypted, optionally interleaved, fragmented, and the various fragments stored on different constituent storage systems commensurate with the storage mechanisms supported by those storage providers.

9 Claims, 4 Drawing Sheets

DISTRIBUTED FRAGMENTS FILE SYSTEM

BACKGROUND OF THE INVENTION

1. Field of the Invention

The present invention relates to a system and method for distributing and storing computer files.

Definitions:

Certain terms used in the Specification as well as the Claims are defined below:

1. File System: a method implemented on a computer for naming of files and the storage of file contents on either non-volatile or volatile media; file systems support hierarchical naming called Paths, and support directories, each of which may contain additional directories and files;
2. Network File System: A file system implemented on a remote computer server and accessible over a communications network using a file-based protocol; Example of two commonly used file protocols are NFS and CIFS.
3. Cloud Service Provider: a provider of remote servers accessible over a network for processing, managing and storage of data; services offered by a Cloud Service Provider may comprise one or more of Compute, Object Storage, Block Storage, and databases;
4. Cloud Provider: Same as and used interchangeably with the term Cloud Service Provider
5. Heterogeneous Service Providers: two service providers are considered heterogeneous if each has separate security controls, systems, and personnel, and does not ordinarily grant access by systems or personnel from the other service provider;
6. Object Storage: Storage of data in objects with the following attributes:
   a. no naming hierarchy or support for directories as seen in file systems
   b. objects are identified with globally unique names
   c. storage (PUT) or access (GET) mechanisms that are compatible with or substantially similar to those offered by any one of the following services:
      i. Amazon S3
      ii. Google Cloud Storage
      iii. Microsoft Cloud Storage
      iv. OpenStack Object Storage
7. Block FEC: Any Forward Error Correction (FEC) scheme with the following attributes:
   a. has an encoder that's used at the transmitting end of a network link and accepts fixed-size blocks of bytes as input and generates as output an additional block of bytes called Parity
   b. has a decoder that accepts the original input blocks and the associated parity bytes (either of which may have errored bytes due to the network transmission process) and is capable of correcting said errored bytes as long as the number of errored bytes is lower than a certain threshold. Examples of Block FEC are Reed Solomon, BCH, and LDPC.

2. Description of Related Art

Conventional distributed computer file systems are known for allowing different subsets of a file system to be on different computer file systems. A given file or a specific replicated instance is stored in its entirety on a single underlying disk or file system.

A conventional file system accessed from a personal computer or a workstation has files that are typically stored entirely on a single hard-disk drive or on a cluster of drives in a scheme called Redundant Array of Independent Disks (RAID). Both types of file systems are prone to data loss and security vulnerabilities due to the following reasons:

1. File data that is not backed up onto a separate drive is lost when the underlying single-drive system fails.
2. RAID systems have the ability to protect against single hard-drive failures by virtue of storing data that is replicated and striped over multiple drives, or striped and stored along with error-correction parity bytes. While the approach is more robust than single-drive systems, it has been shown that multiple disk-drive failures tend to be more frequent (somewhat negating the advantage of RAID systems) than would be expected from statistical and probabilistic analysis. The reasons for the higher-than-expected correlation in failure is the identical aging profile and similar environmental factors (such as temperature, humidity vibration and power fluctuations) experienced by the underlying physical drives when clustered in the same facility or cabinet. Traditional RAID systems employ sets of identical disks that are highly synchronized in terms of access times.
3. When file data is located in a conventional single file system, it is more vulnerable to theft as a potential intruder only needs to discover the security vulnerabilities of that particular file system.

Similarly, conventional systems that utilize cloud services for storage tend to store related application data with a single cloud-service provider. This approach suffers from the same security vulnerability, because a potential intruder only needs to be able to breach the information security barriers of that cloud provider.

Use of a single cloud-service provider for storage of all data also heightens the risk of loss of access whenever there's an outage at that provider, and a commonly used approach against a single-provider outage involves replicating data across multiple cloud providers. Replication not only increases storage costs, but also increases the number of attack vectors by allowing a potential intruder access to data by breaching any one of the providers.

Considering the limitations described above, it is desirable to provide an improved storage scheme having reduced storage requirements as well as improved security and fault-tolerance.

SUMMARY OF THE INVENTION

The present invention relates to a distributed storage scheme for computer data, referred to as Distributed Fragments Storage System (DFSS). DFSS uses N (N>=1)—potentially heterogeneous—storage systems, which may be a combination of file systems or cloud storage providers, for creating a unified and, if desired, physically distributed file system. In one embodiment of this invention, every file is encrypted, interleaved, and broken into N fragments, and the respective fragments are stored on different constituent storage systems. This is in contrast to conventional distributed file systems where different groups of files may be on different file systems, but a given file or its replicated instance is stored in its entirety on a single underlying disk or file system. The creation and distribution of file fragments of each file in the present invention—as opposed to distribution of entire files—provides the following advantages:

1. Intrinsic security: DFSS improves security as a given file is not found in its entirety on any specific storage system, but is optionally encrypted, optionally interleaved, fragmented, and dispersed across one or more (N), potentially heterogeneous, storage systems (such as file systems or cloud-storage providers).

2. Fault tolerance: The distributed storage scheme supports storage redundancy that tolerates one or more faults in the constituent storage systems. Redundancy is achieved without replicating file data, but through use of suitable block FEC codes. File access remains uninterrupted, and potential failures of one or more constituent storage systems are transparent to the users of DFSS.

3. Reduced storage requirements: Instead of full replication of files that are distributed across N storage systems (implying a storage expansion factor of N), DFSS employs a scheme with an N/(N−1) storage expansion factor, where N is the number of constituent storage systems. Storage redundancy overhead necessary to tolerate, for example, loss of a single storage system, decreases as the number of storage systems increases. For example, when N is 3, the storage expansion factor is 1.5. When N is 4, the storage expansion factor is only 1.33. Both those cases compare very favorably with the respective expansion factors of 3 and 4 for conventional storage schemes.

4. Use of heterogeneous storage systems with no stringent timing synchronization requirements or similarity of lower-level parameters such as block sizes allows these systems to be geographically distributed.

DFSS is broadly applicable, but is especially useful when storing data at facilities—such as cloud storage providers—that are not controlled or maintained by the creator or owner of the data. Users of DFSS, in one embodiment, can purposely utilize multiple heterogeneous cloud-storage providers to create a customized and virtualized cloud storage system with the following security advantages:

A. No single cloud-storage provider stores the entire file. Only fragments—derived by a process involving an optional encryption step, an optional interleaving step, and a slicing step—of a file are stored at each cloud provider.

B. A breach of security at any of the constituent cloud providers provides access only to an undecipherable fragment of data, due to use of encryption and interleaving during the storage process.

In one embodiment, the interleaving and fragmentation are performed after encrypting the file. In another embodiment, interleaving and fragmentation are done first while encryption is applied to the resulting fragments. In either embodiment, when N>1, security is enhanced because theft of a data fragment from any of the constituent storage systems does not result in the loss of any information, because access to other fragments residing at other cloud providers or constituent file systems—is essential for reconstructing the original file. Any potential service interruptions at a cloud service provider are transparent and non-disruptive as well.

DFSS does not require replication of data for tolerating failures of the constituent storage systems. This translates into lower expenses compared to traditional replication-based storage systems.

The invention will be more fully described by reference to the following drawings.

DETAILED DESCRIPTION

Figure 1:
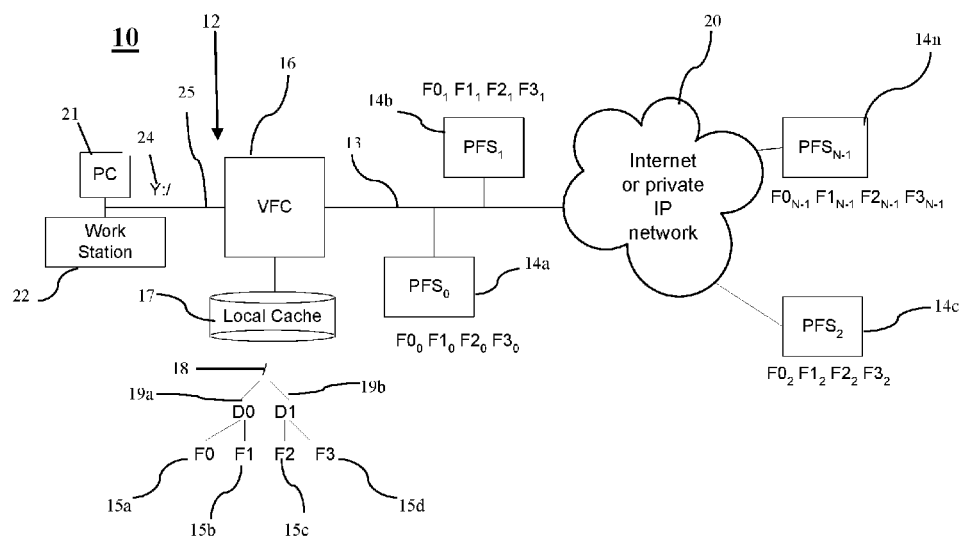
FIG. 1 is a schematic diagram of a Distributed Fragmented File System (DFSS) in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a schematic diagram of a DFSS system, 10. DFSS 10 aggregates one or more (N) storage systems (PFS) 14a-14n—some of which may be geographically dispersed—into a virtual file system (VFS) 12.

The following terminology is used:

1. N is the number of constituent file systems, each capable of hosting a conventional file system structure comprised of directories and files. A subset of $PFS_0$ through $PFS_{N-1}$ may also be, possibly heterogeneous, cloud service providers that are based on Object Storage instead of file storage.

2. Virtual File System (VFS) aggregates constituent file systems denoted PFS0, PFS1 . . . PFSN−1.

3. A file in VFS is denoted as F, and it is fragmented and, respective fragments are stored as file fragments $F_0, F_1 \ldots F_{N-1}$ in the underlying file systems designated $PFS_0$, $PFS_1 \ldots PFS_{N-1}$, respectively. Under this scheme, fragment $F_0$ is a valid file under physical file system $PFS_0$, fragment $F_1$ is a valid file stored at $PFS_1$, and so on. If object storage is used, the respective fragments are stored as objects.

4. A virtual file system controller (VFC) is a master controller which maintains and controls the virtual file system (VFS).

5. End-user PCs and workstations communicate with the virtual file system controller (VFC) and mount virtual file system (VFS) using conventional protocols such as Network File System (NFS) or CIFS. The VFC in turn uses protocols specific to each of the file systems or cloud service providers in a manner transparent to the end-user PCs and workstations. $PFS_0$, $PFS_1$, . . . $PFS_{N-1}$ can each employ one of a myriad of different file system protocols such as NFS, iSCSI, SMB, or HTTP/HTTPS REST-based cloud object storage or other protocol and storage mechanisms known in the art in accordance with the teachings of the present invention.

6. The virtual file system controller (VFC) supports conventional file operations such as open( ), close( ), read( ), write( ), delete( ) and stat( ).

7. The virtual file system controller (VFC) also supports directory operations such as mkdir( ), list( ) and rmdir( ).

8. The virtual file system controller (VFC) uses local dedicated storage for its own operations and, optionally, for caching of frequently used files. It relies primarily on $PFS_0 \ldots PFS_{N-1}$ for actual storage of data.

PFS0 (14a), PFS1 (14b) and virtual file controller (VFC) 16 are on Local Area Network (LAN) 13. $PFS_2$ (14c) . . . $PFS_{N-1}$ (14n−1) are in, possibly geographically dispersed, areas connected via network 20. Network 20 can be the internet or a private IP network. $PFS_0$ (14a) and $PFS_1$ (14b) are used as examples to show flexibility of placement of file systems. It will be appreciated that $PFS_0$ (14a) and $PFS_1$ (14b) do not need to be local.

Virtual file system (VFS) 12 in this embodiment is shown hosting a directory structure comprised of the root directory (/) 18, sub directories D0 19a and D1 19b, and files F0 15a ... F3 15d. The example directory structure is not intended to imply limitations in the number of files, directory structure depth, or file sizes. DFSS 10 scales to support extremely large file systems with directory depth levels and the number of files only limited by the amount of storage available across the constituent file systems.

Personal computer (PC) 21 mounts Virtual File System (VFS) 12 from virtual file system controller (VFC) 16 using a drive mapping (Y:/ 24, for e.g.) and protocol 25. For example, Virtual File Controller (VFC) 16 can use one of the standard protocols, such as NFS or CIFS for the drive mapping. Workstation 22 mounts virtual file system (VFS) 12 from virtual file system controller (VFC) using protocol 25. For example, workstation 22 can be a UNIX workstation. Personal computer (PC) 21 and workstation 22 mount root directory structure 18.

Virtual file system controller (VFC) includes local cache 17 which optionally utilizes a Least-Recently-Used (LRU) scheme for management of the overall cache. It will be appreciated that other cache-management schemes known in the art can be used in accordance with the teachings of the present invention. Subdirectories 19a-b and files 15a-d are available to both personal computer (PC) and workstation 22. Subdirectories 19a,b and files 15a-d shown for this embodiment have paths /D0/F0, /D0/F1, /D1/F2 and /D1/F3.

Figure 2:
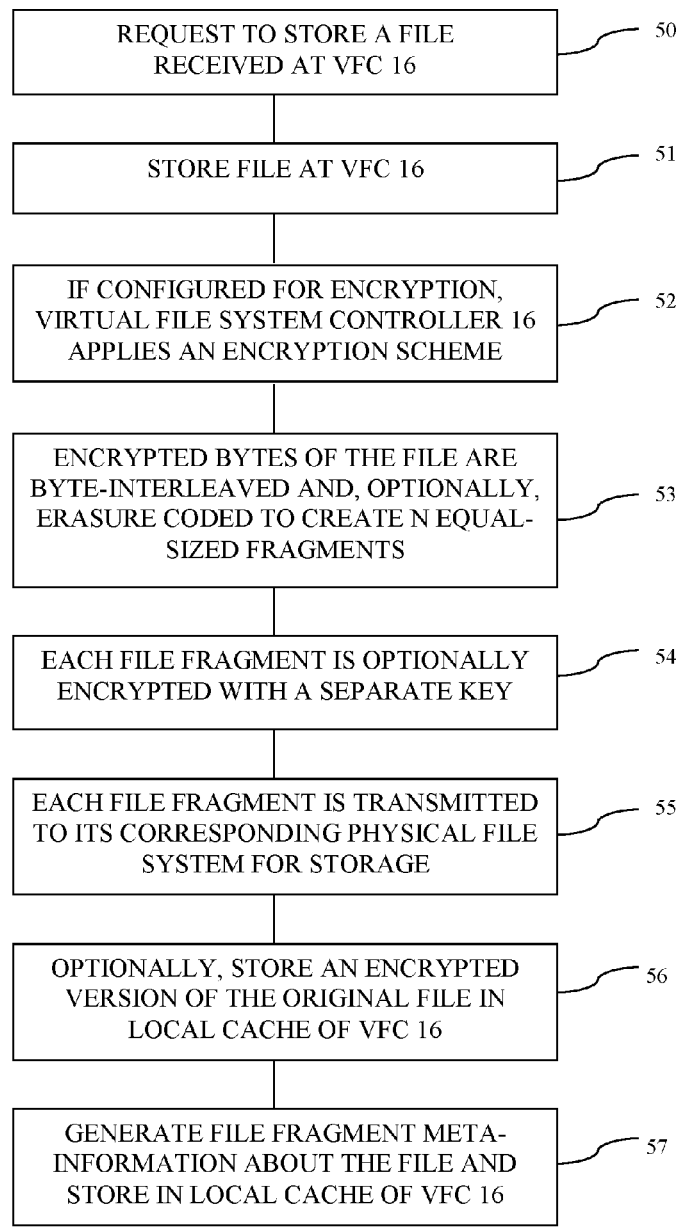
FIG. 2 is a flow diagram of a process to create and store a file at a virtual file system controller (VFC) that implements the DFSS methods.

FIG. 2 is a flow diagram of processing steps undertaken by virtual file system controller (VFC) 16 to create and store a file, such as file F0 15a. In block 50, virtual file system controller (VFC) 16 receives a write request from personal computer 21 or workstation 22 to create file F0 15a and its associated data within the file. In block 51, virtual file system controller (VFC) 16 stores file F0 15a in local cache 17 for further processing. In block 52, if configured for encryption, virtual file system controller VFC 16 uses an encryption key, K0, and applies an encryption scheme to the contents of file F0 15a. For example, K0 can be prepared through any number of conventional schemes, such as, for example, the use of random number generators. Example encryption schemes include, but are not limited to, advanced encryption standard (AES) and triple data encryption algorithm (3DES).

In block 53, encrypted bytes of file F0 15a are interleaved and, optionally, subject to Forward Error Correction (FEC) coding as described below to create N fragments denoted $F0_0, F0_1, \ldots F0_{N-1}$, which may not necessarily be equal sized, but preferred embodiment assumes are equal sized. In block 54, each file fragment is optionally encrypted with a separate key.

In block 55, each file fragment is transmitted to its corresponding storage system (PFS) 14a-14n for storage using its respective storage protocol. File fragment $F0_k$ is stored on $PFS_k$ in the directory specified by the full pathname of the file (if file system-based) or using a globally unique identifier, if object based. In block 56, virtual file system controller VFC 16, optionally, also stores an encrypted version of the original file in local cache 17 for fast response to future read requests from other clients. If the cache is full, the LRU scheme is used for freeing up storage in the cache.

In block 57, file fragment meta-information about file F0 15a is stored in local cache 17 of virtual file system controller (VFC) 16. For example, file fragment meta-information can include information about the file system (PFS) instances that store the fragments of the file; the order of distribution of fragments across storage systems; whether FEC was used; access permissions; creation/modification times of the original file, and creation times of the respective fragments. File fragment meta-information can also include the size of the file and the key K0 used for the encryption of the overall file. Storage of other types of information in the meta-headers is not precluded.

Figure 5:
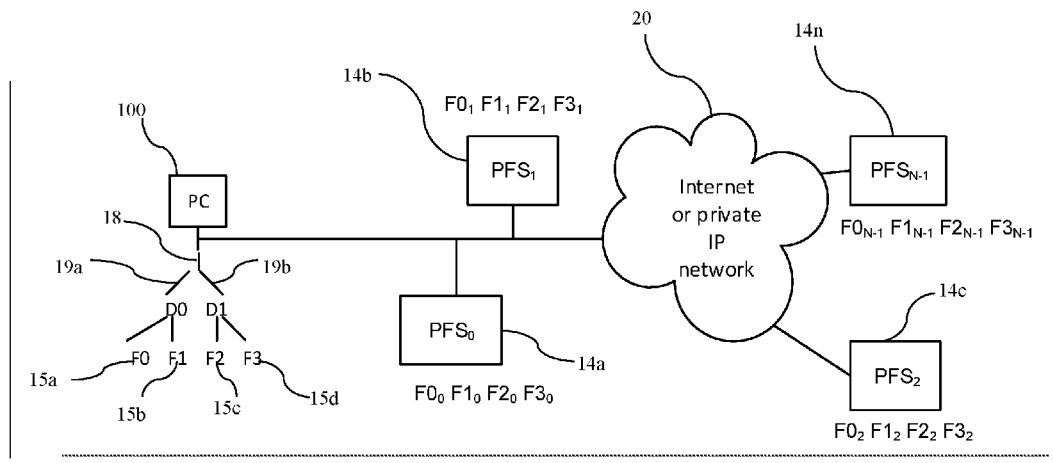
FIG. 5. is a schematic diagram of another embodiment of a system utilizing DFSS.

In another embodiment (FIG. 5), no VFC is required and meta-information itself is stored as fragments using a recursive application of the present invention across the same or different set of storage systems.

Figure 3:
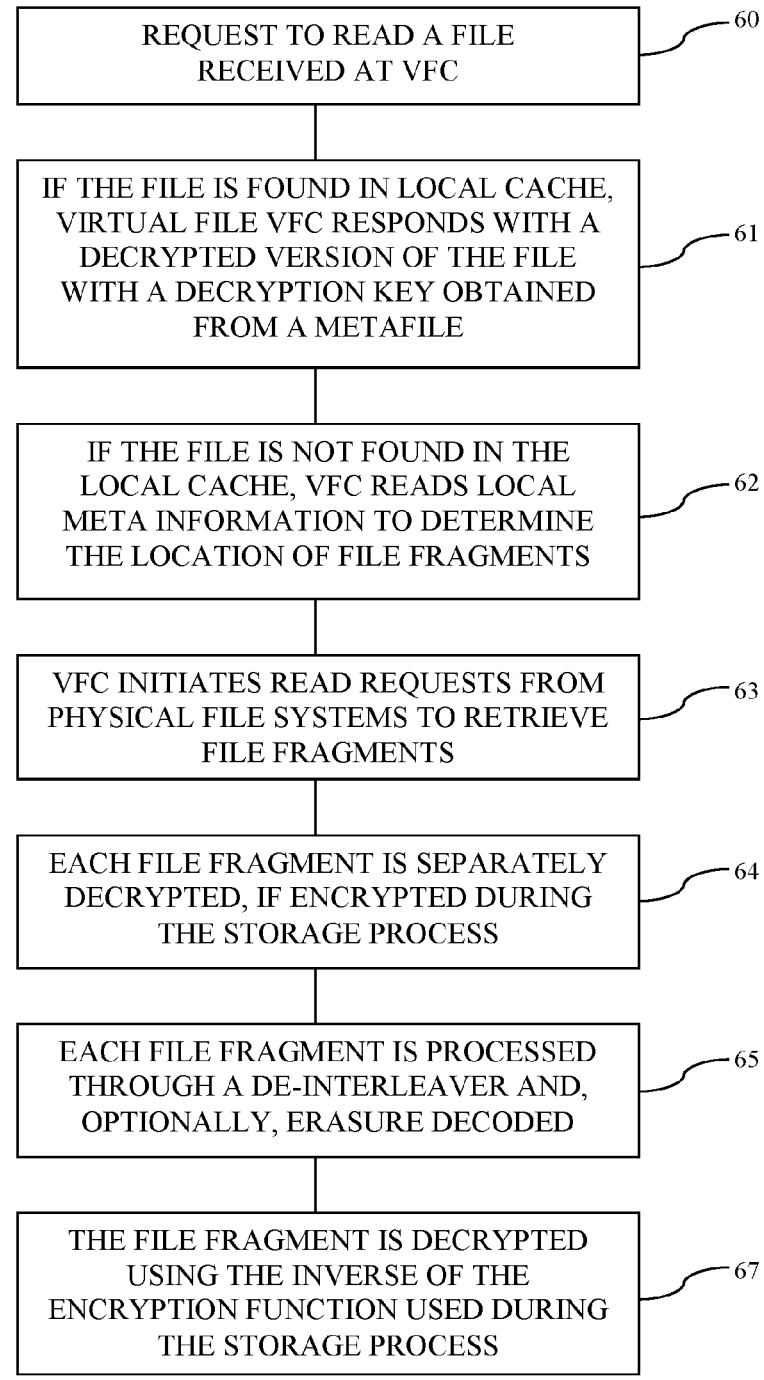
FIG. 3 is a flow diagram of a process for reading the file from the virtual file system controller (VFC).

FIG. 3 is a flow diagram of a process for reading a file $F_0$ 15a from virtual file system controller (VFC) 16. In block 60, virtual file system controller (VFC) 16 receives a read request from one of its client nodes for file F0 15a. If file F0 15a is found in local cache 17, virtual file system controller (VFC) 16 responds with a decrypted version of file F0 15a with a decryption key obtained from a metafile for F0 in block 62. If file F0 15a is not found in local cache 17, virtual file system controller VFC 16 reads local meta information about file F0 15a in order to determine the location of file fragments in block 63. In block 64, virtual file system controller (VFC) 16 initiates read requests from $PFS_0$ 14a ... $PFSN_{N-1}$ 14n to retrieve file fragments $F0_0, F0_1, \ldots F0_{N-1}$ If one of the file systems $PFS_0$ 14a, ... $PFS_{N-1}$ 14n does not respond, then, if FEC coding was used during the storage process, the corresponding file fragment is assumed filled with 0s and recreated as described later. For example, either one of the file systems, $PFS_0$ 14a ... $PFS_{N-1}$ 14n may not respond because of loss of network connectivity, or failures in its constituent disk drive systems or other reasons.

In block 65, each file fragment, $F0_0, F0_1 \ldots F0_{N-1}$, is separately decrypted, if encrypted during the storage process. In block 66, each file fragment, $F0_0, F0_1, \ldots F0_{N-1}$, is processed through a de-interleaver and, optionally, decoded using FEC techniques as described below. The result is file F0'. In block 67, file F0' is decrypted using the inverse of the encryption function used during the storage process. The decryption key K0 is obtained from the meta-file associated with file F0'. The virtual file system controller (VFC) responds to the requesting client with the decrypted contents of file F0.

Figure 4:
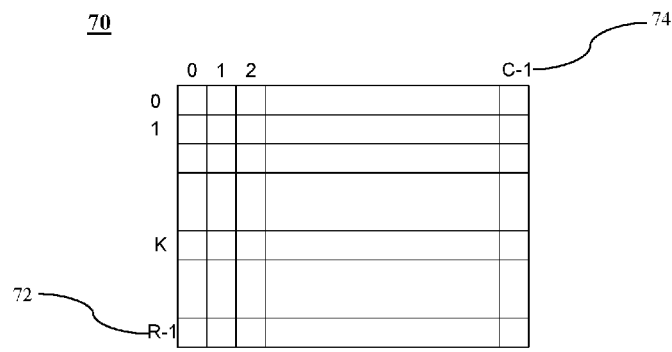
FIG. 4 is a schematic diagram of an interleaver.

An example interleaver is shown in FIG. 4. Byte interleaver array 70 of R rows 72 and C columns 74. Wherein R is a fixed number of the form $2^m-1$, where m is typically [4-7] but higher values are not precluded. C is max (N, (S+R−1)/R) where S is the size of the file. If FEC support is desired for fault tolerance against failures of one or more constituent file systems, then the last K rows of the interleaver array contain encoded bytes that are computed using block FEC encoders. Otherwise the last K rows contain normal file data. The FEC encoding and decoding process along with calculation of K are described later.

During interleaving, the bytes of the file are stored column-first in byte interleaver array 70. Bytes are stored in column 0 starting at row 0 and all rows except the last K rows (if FEC is enabled) are filled. If FEC is not used, last K rows contain regular data. Once column 0 is filled, the process is repeated for the remaining C−1 columns. Zero padding is used to fill out a partially filled array.

It will be appreciated that other interleaving and de-interleaving processes known in the art can be used in accordance with the teachings of the present invention. Rows of interleaver array 70 are assigned to N different file fragments in a round-robin fashion. Row q is assigned to fragment number (q mod N), and so on. Thus row 0 maps to fragment 0, row N−1 to fragment N−1, row N to fragment 0, row N+1 to fragment 1, and so on. All fragments that map to the same PFS instance are stored in a single file on that instance.

If N is small, the number of rows can be increased to be a multiple, m, of N, resulting in m*N rows. Each storage system, $PFS_k$, receives m rows from the interleaver table.

For the de-interleaving process, file bytes received in file fragments are stored row-wise and read out column-wise. A file fragment received from a file system (PFSi) is unpacked and consecutive sets of C (the number of columns in the de-interleaver array) bytes are stored at row indices i, i+N, i+2*N . . . respectively. It will be appreciated that other fragmenting and unpacking of file fragment processes known in the art can be used in accordance with the teachings of the present invention.

In an alternate embodiment, file interleaving can be performed when error correction support is enabled for tolerating failures or loss of access to one of the underlying constituent physical file systems (PFS). When storing the original bytes of the file in interleaver array 70, only K rows of each column are filled. The remainder R-K rows of each column are filled with the parity bytes computed using a suitable erasure code, such as for example Reed Solomon.

K is defined as (N−1)/N*R resulting in R/N parity bytes.

Erasure encoding is done column-wise. The first K rows of every column contain actual file data and provide input of information bytes to the erasure encoding process, which generates R-K parity bytes for every column.

All R rows of interleaver array 70 act as the source of data put into fragments stored on a plurality of storage systems (PFS). It will be appreciated that other erasure processes known in the art can be used in accordance with the teachings of the present invention.

File de-interleaving can be performed when error correction support is enabled. File fragments received from various file systems (PFS) 14a-14n are unpacked and bytes written to de-interleaver array 70 as described above. In addition, all R rows corresponding to a file fragment that is not received from a physical file system (PFS) 14a-14n are marked for erasure. Once all R rows are filled, erasure decoding is done column-wise using the converse of the erasure encoding process described above. A row marked for erasure results in a single erasure byte in every column. Use of sufficient parity bytes (R-K) per column ensures missing bytes, such as from a fragment not received from a storage system, are recreated. Only the first K rows of de-interleaver array 70 are used for recreating the original file, i.e., the parity bytes are discarded once the erasure decoding process is run on each column.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed:

1. A method for improving the storage security and fault-tolerance of a digital computer file, F, comprising the steps of:
   a. using N (N>1) heterogeneous (independently owned and operated) cloud providers, $CP_0 \ldots CP_{N-1}$, such that each cloud provider stores a unique fragment of file F, wherein:
   b. encrypting the file, F, using a new b-bit random number, k, where b is the relevant encryption key size in bits, and generating file F'; if encryption is not use F'=f;
   c. using an interleaving scheme for rearranging the order of bytes or bits in F' and creating an output stream, F", with a preferred embodiment based on the use of a rectangular matrix written column-wise and read row-wise;
   d. dividing up F" for use with FEC encoders, with the preferred embodiment configured for fault tolerance against failure of one of the constituent cloud providers;
   e. applying the FEC encoding to each input block of size K generated by the previous step, and obtaining output blocks of size R (R=K+P, P is the number of parity bytes generated by the selected FEC encoder);
   f. fragmenting each output block from step 'e' above into N sub-blocks, one per cloud provider;
   g. storing fragments generated by step f above based on an adaptation process comprised of:
      i. optional merging of one or more fragments from different output blocks of step 'f' and creating bigger fragments, one per file system;
      ii. optional encryption of the resulting fragments from step 'g.i' above
      iii. simultaneously storing, through parallel network transactions, the resulting N fragments from step 'g.ii' above at N cloud providers; or
      sequentially storing, when parallel operations are not feasible or desirable, the resulting N fragments one at a time with the respective N cloud providers;
   h. creating meta information comprising file size, file modification date, access permissions, number of file systems, encryption type, encryption keys, FEC type, or any other fields or values about the file considered useful for display, listing, access or reassembling fragments when the file is read; and
   i. storing the meta information through recursive application of the present invention across the same set of N cloud providers or a subset of those N cloud providers or another set of M cloud providers (M>=1).

2. The method of claim 1, but applied in reverse, for retrieving a digital computer file, F, and comprising the following steps:
   a. fetching meta information associated with file, F, for establishing the cloud providers that stored the fragments of file;
   b. retrieving fragments from each of the constituent cloud providers listed in the meta information;
   c. decrypting each fragment if each fragment was subject to encryption during the storage process;
   d. accepting fragments from the first Q cloud providers (Q (Q<N) is the minimum number of cloud providers necessary for recreating the whole file using erasure decoding, Q==N when FEC encoding is not used) that respond and ignoring or terminating the response from the remaining N−Q cloud providers;
   e. combining the file fragments and, if FEC was used during the storage process for the file, and if fragments from one or more file systems are missing, performing FEC decoding by doing the reverse of the FEC encoding process used during the storage of the file;
   f. performing the bit or byte de-interleaving, if interleaving was applied during the storage process; and
   g. performing decryption of the resulting data stream, if encryption was used during the storage process.

3. The method of claim 1 where no more than Q−1 cloud providers (Q<=N and Q is the minimum number of cloud providers required to recreate a file) are non-heterogeneous.

4. The method of claim 3 further comprising use of one or more instances of the following types of computer networking interfaces or connections:
   a. a network file system interface for exporting file systems to other computers acting as clients, such as laptops, desktops, servers or mobile devices;
   b. a network file system connection with another file server;
   c. a cloud storage connection with a cloud service provider.

5. The method of claim 4 that uses non-volatile storage for temporarily caching files for converting them into fragments or for reassembling fragments into files, or for providing faster access to files by storing local copies.

6. The method of claim 4 that uses a computer or a set of computers, acting as a gateway service or appliance for allowing client computers to store files using heterogeneous cloud providers.

7. The method of claim 5 that uses a computer or a set of computers as a gateway service or appliance for allowing client computers to store files using heterogeneous cloud providers.

8. The method of claim 4 implemented as a virtual drive or a virtual file system on any computer.

9. The method of claim 5 implemented as a virtual drive or a virtual file system on any computer.

* * * * *